United States Patent [19]

Shane

[11] Patent Number: 4,814,218

[45] Date of Patent: Mar. 21, 1989

[54] QUILTED CRAFT ARTICLE AND METHOD AND KIT FOR MAKING SAME

[75] Inventor: Barry Shane, West Hartford, Conn.

[73] Assignee: JMC Black, Inc., Rockville, Conn.

[21] Appl. No.: 114,719

[22] Filed: Oct. 30, 1987

[51] Int. Cl.[4] .............................................. G09B 11/00

[52] U.S. Cl. ................................ 428/102; 112/266.1; 112/439; 428/906.6

[58] Field of Search .................. 112/266.1, 262.1, 439; 428/102, 542.2, 906.6

[56] References Cited

U.S. PATENT DOCUMENTS

| | | | |
|---|---|---|---|
| 2,291,935 | 8/1942 | Woodall et al. | 112/262.1 X |
| 3,240,176 | 3/1966 | Morrison | 112/439 |
| 3,404,647 | 10/1968 | Pohl et al. | 428/102 X |
| 3,570,435 | 3/1971 | Morrison | 112/439 X |
| 3,898,943 | 8/1975 | Braden et al. | 112/262.1 X |
| 4,134,352 | 1/1979 | Csudor | 112/262.1 X |
| 4,355,722 | 10/1982 | Lemmeyer | 428/542.6 X |
| 4,386,980 | 6/1983 | Fitzpatrick et al. | 428/102 X |
| 4,514,175 | 4/1985 | Maruba et al. | 428/542.2 X |
| 4,578,131 | 3/1986 | Hawkins, Jr. | 428/542.2 X |
| 4,634,616 | 1/1987 | Musante et al. | 112/266.1 X |

*Primary Examiner*—Nancy A. B. Swisher
*Attorney, Agent, or Firm*—John H. Crozier

[57] ABSTRACT

The present invention provides a substrate having a pattern of a quilted article on one surface thereof. The substrate is preferably a rigid, but relatively easily cut material such as expanded polystyrene. Slits are cut into the substrate along the lines defining the pattern. A paper pattern having thereon a pattern identical to one on the substrate is also provided. The pattern comprises sections identified by numbers and all sections identified by the same number have the same quilt element. The quilt elements are made by cutting sections from the paper pattern and using the sections as templates to cut pieces of fabric somewhat larger than the template, resulting in the creation of excess fabric surrounding the template. The pieces of fabric are then attached to the substrate by punching the excess fabric into the slits surrounding the corresponding section on the substrate. The process is repeated for other sections on the substrate to produce the completed quilted article. The resulting article is substantially the same in appearance as one produced by conventional methods requiring a high degree of manual dexterity and artistic talent.

12 Claims, 1 Drawing Sheet

QUILTED CRAFT ARTICLE AND METHOD AND KIT FOR MAKING SAME

BACKGROUND OF THE INVENTION

1. Field of the Invention

The present invention relates to quilted craft articles, in general, and, more particularly, to a quilted craft article, and a method and a kit for making the article, which article can be satisfactorily made by people of a wide range of ages without the need for a high degree of manual dexterity or artistic skills.

2. Background Art

Conventionally, quilting is the process of stitching together at least two layers of fabric, usually with some soft, thick substrate placed between them. The substrate is typically wool, cotton, or the like which gives the resulting article "body" and may provide insulation. The stitching keeps the stuffing evenly distribted and also provides opportunity for artistic expression in both design and execution. In some periods, quilting has reached the status of a minor art and some quilted articles are now museum pieces. As quilting evolved in America in the 18th and 19th centuries, quilted top layers were frequently hundreds of colored fabric pieces stitched together as patchwork.

In one method of making a quilt, a frame is provided which is covered with a lining, typically muslin. On top of the lining, the substrate fiber or fabric is placed. Then, the top layer is placed in position and its edge pinned or basted to the edge of the lining, drawing it tightly over the substrate. The quilting pattern is marked on the top layer with a tracing wheel and chalk, by pencil, or by pressure of a needle marking an indentation around a rigid pattern of wood. The layers are then stitched together—with some difficulty, when the quilt is heavily padded. In some cases, the quiltwork is laboriously stuffed after stitching with a substantial amount of additional substrate to produce a "stuffed work" quilt. Some quilts are utilitarian, such as bedspreads, and other are merely decorative, such as those intended to be used as wall hangings. It can be appreciated that making such quilts is generally limited to those having a relatively high degree of manual dexterity and artistic talent, as well as sufficient time to undertake such projects.

With the current resurgence of interest in crafts, particularly early American crafts, it would be desirable to have a quilted craft article and means for making the same that is relatively easy to make, yet produces an article that is substantially as satisfying and esthetically pleasing as one produced by conventional methods.

Accordingly, it is a principal object of the present invention to provide a quilted craft article that is relatively easy to make.

It is another object of the present invention to provide a quilted craft article which can be made by one having only an ordinary degree of manual dexterity and minimal artistic skills.

It is a further object of the present invention to provide a quilted craft article which has the appearance of a quilted article produced by conventional methods.

Yet another object of the present invention is to provide a quilted craft article which may be made without the need for stitching.

It is an additional object of the present invention to provide a kit for making a quilted craft article.

Other objects of the present invention will, in part, be obvious, and will, in part, appear in the following description.

SUMMARY OF THE INVENTION

The present invention accomplishes the objects set forth above by providing a substrate having lines defining a pattern of the quilted article on one surface thereof. The substrate is preferably a relatively rigid material which may be relatively easily cut, such as expanded polystyrene. Slits are cut into the substrate along the lines defining the pattern. A paper pattern having thereon a pattern identical to one on the substrate is also provided. The pattern comprises sections identified by numbers and all sections identified by the same number have the same quilt element. The quilt elements are made by cutting a section from the paper pattern and using the section as a template to cut a piece of fabric somewhat larger than the template, resulting in the creation of excess fabric surrounding the template. The fabric is then attached to the substrate by punching the excess fabric into the slits surrounding the corresponding section on the substrate. The process is repeated for other sections on the substrate until the article is completed. The finished article has substantially the appearance of quilted articles produced by conventional methods.

DESCRIPTION OF THE PREFERRED EMBODIMENTS

Figure 1:
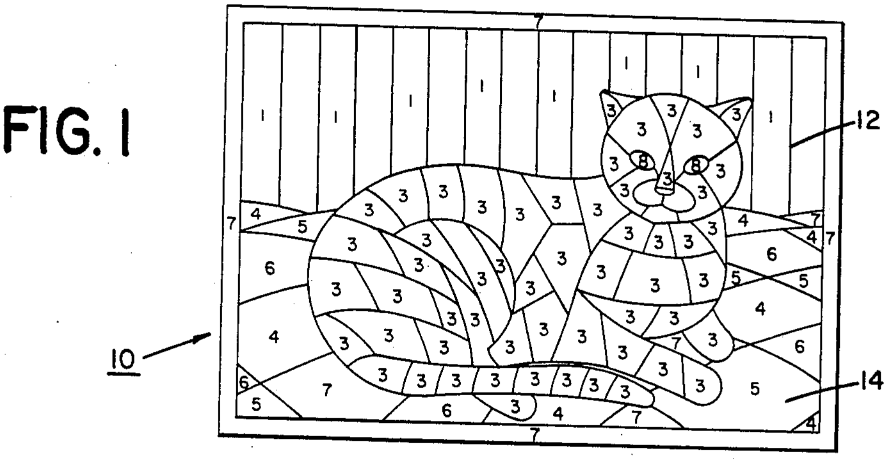
FIG. 1 is a view of the substrate of the present invention with the pattern of the article thereon.

Referring now to the drawing, FIGS. 1 through 5 illustrate the quilted article of the present invention and the method of making the same.

FIG. 1 is a view of the substrate of the quilted craft article according to the present invention, generally indicated by the reference numeral 10, with the first lines on a first surface thereof, as at 12, which lines together define the pattern of the final quilted article, in this case a reclining domestic cat. The pattern comprises numbered sections, as at 14, the function of which will be described hereinafter. Substrate 10 may be of any material suitable for the method of the present invention which is reasonably rigid and easily cut, but one which has been found to have particularly good characteristics is expanded polystyrene. In one embodiment, substrate 10 is expanded polystyrene board and may be about 12 inches wide by about 18 inches long by about one inch thick. While the present invention has been described as including substrate 10 as a flat board, it is also within the intent of the invention to encompass a substrate of any desired shape.

Figure 2:
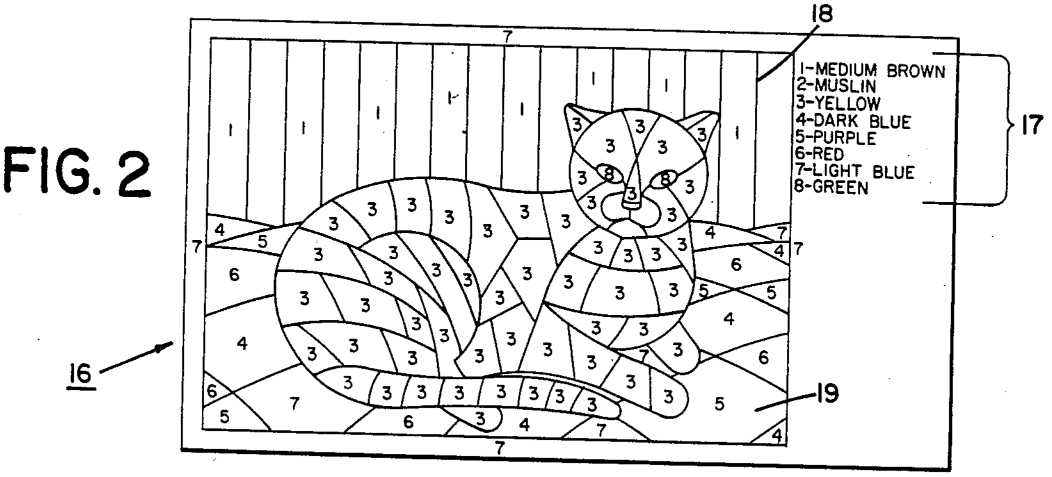
FIG. 2 is a view of a paper pattern of the present invention also having the pattern of the article thereon.

FIG. 2 shows a paper pattern of the present invention, generally indicated by the reference numeral 16, having second lines, as at 18, which lines together define a pattern comprising numbered sections, as at 19, which pattern is identical to the pattern defined by first lines 12 on substrate 10 of FIG. 1. Paper pattern 16 may include a legend 17 indicating the colors of sections 19.

Figure 3:
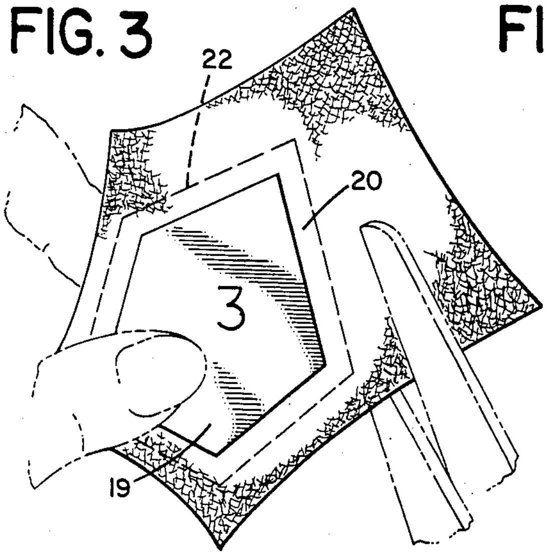
FIG. 3 shows a section of the paper pattern being used as a template for cutting a piece of cloth for the quilted article.

FIG. 3 illustrates how paper pattern 16 of FIG. 2 is used in making the quilted article. Here, one of numbered sections 19, this particular one being identified with the numeral "3" on the pattern, has been cut from paper pattern 16 and is being used as a template to cut cloth 20. Cloth 20 is cut so as to provide a piece of cloth somewhat larger than section 19, as indicated by dashed line 22, providing a strip of excess material surrounding the template. With a substrate 10 having the thickness dimension set forth above, is has been found preferable to cut the cloth about ¼-inch outside of the edges of section 19. The identifying numeral, in this case "3", identifies what color an/or pattern cloth is to be used for that section, with all sections identified as "3" requiring the same color and/or pattern. Likewise, other identifying numerals on numbered sections 19, which correspond to identical sections 14 on substrate 10, uniquely identify other colors and/or patterns to be used for those sections.

In preparation for the next step (not shown) in making the quilted article, a cutting tool is used to cut into substrate 10, forming first slits, as at 24, the slits being substantially perpendicular to the first surface of the substrate, along lines 12 defining one of sections 14, specifically the section on substrate 10 which corresponds to cloth 20 cut in the preceding paragraph. With a one-inch thick polystyrene substrate, it has been found satisfactory to have the depth of the cut be about one-half the thickness of substrate 10. Any suitable cutting implement (not shown) may be used, but an X-Acto knife with a #11 blade has been found to be satisfactory. A common fingernail file or a similar implement may also be used.

Figure 4:
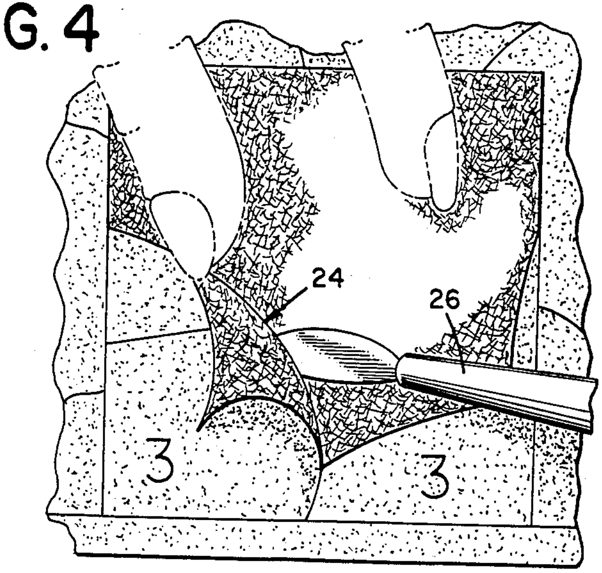
FIG. 4 shows the cut piece of cloth being attached to the substrate.

Referring now to FIG. 4, the piece of cloth 20 cut as above is placed over the corresponding section 19 on substrate 10. Cloth 20 is now attached to substrate 10 by punching, with punching implement 26, the excess material into a first slit 24 which was made along line 12 around the above corresponding section 14. The excess material of cloth 20 is forced into, and grippingly held by, first slit 24 using any suitable punching implement 26; and, when the cutting tool (not shown) for making the slits is somewhat blunt, such as a fingernail file, it may be used also as the punching implement.

Figure 5:
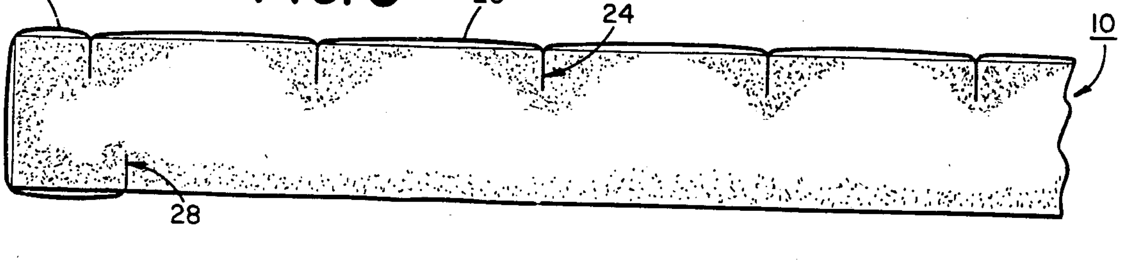
FIG. 5 is a cross-sectional view of the substrate showing pieces of cloth attached thereto.

FIG. 5 is a cross-sectional view of substrate 10 showing pieces of cloth, as at 20, grippingly held in place in first slits 24. It can be seen that the punching operation has given pieces of cloth 20 a somewhat puffed or stuffed appearance similar to the more complicated conventional quilting methods discussed above. FIG. 5 also illustrates how a "border" may be applied to substrate 10. Here, a second slit 28 has been cut into the second surface of substrate 10 in the manner described above. Border cloth 30 punched into one of first slits 24 has been folded over the edge of substrate 10 and punched into second slit 28, thus forming a border on, as well as quilting the side of, substrate 10. With the one-inch thick substrate described above, it has been found that placing second slit 28 about one inch from the edge of substrate 10 provides a satisfactory border and edge treatment. When substrate 10 is a material such as expanded polystyrene, as described above, it may be easily hung on a wall by simply pressing it onto a nail in the wall.

A basic kit for the quilted article described above comprises substrate 10 and paper pattern 16, which kit one would use to apply one's own fabric with one's own cutting tool and punching implement. Further elements of the kit may include: a supply of fabrics of various colors and/or patterns 20, a cutting tool (not shown), a punching implement 26, instructions (not shown), and/or a carrying case (not shown) for all elements of the kit. As an alternative to providing an uncut substrate in the kit, the present invention also encompasses providing a pre-cut substrate instead, in which case, no cutting tool would need to be provided in the kit.

It can be seen that what has been provided is a quilted craft article, and a method for making the same, that can be made easily by one having only an ordinary degree of manual dexterity and minimal artistic skills. The article does not require stitching, but has substantially the appearance of a quilted article produced by conventional methods. Further, there has been described a kit for making the quilted craft article.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A quilted craft article, comprising:

(a) a substrate having on a surface thereof lies defining a pattern of the quilted article and defining individual sections of said pattern;

(b) slits formed in said substrate extending partially into said substrate, along said lines;

(c) pieces of fabric, larger than said sections, defining excess material, each said piece of fabric corresponding to one of said sections; and (d) each said piece of fabric being attached to said substrate by said excess material of said piece of fabric being grippingly held within said slits surrounding said corresponding said sections.

2. A quilted craft article, as defined in claim 1, wherein said substrate is expanded polystyrene.

3. A method of making a quilted craft article, comprising:

(a) providing a substrate having on a surface thereof first lines defining a pattern of the quilted article and defining individual sectionsn of said pattern;

(b) forming slits in said substrate extending partially into said substrate, along said lines;

(c) providing pieces of fabric, larger than said sections, defining excess material, each said piece of fabric corresponding to one of said sections; and (d) attaching each said piece of fabric to said substrate by punching the excess material of said piece of fabric into said slits surrounding the corresponding one of said sections.

4. A method of making a quilted craft article, as defined in claim 3, further comprising:

(e) providing a paper pattern having thereon second lines defining a pattern and sections identical to said pattern and sections on said substrate (f) cutting each said section from said paper pattern; and (g) using said cut sections as templates to cut said pieces of fabric larger than said sections.

5. A method of making a quilted craft article, as defined in claim 3, wherein said substrate is expanded polystyrene.

6. A kit for making a quilted craft article, comprising:

(a) a substrate having on a surface thereof first lines defining a pattern of the quilted article and defining individual sections of said pattern adapted to have slits formed in said substrate along said lines extending partially into said substrate; and (b) a paper pattern having thereon second lines defining a pattern identical to said pattern on said first surface of said substrate.

7. A kit for making a quilted craft article, as defined in claim 6, further comprising:

(c) pieces of fabric.

8. A kit for making a quilted craft article, as defined in claim 6, further comprising:

(d) a cutting tool.

9. A kit for making a quilted craft article, as defined in claim 6, further comprising:

(e) a punching tool.

10. A kit for making a quilted craft article, as defined in claim 6, further comprising:

(f) instructions.

11. A kit for making a quilted craft article, as defined in claim 6, further comprising:

(g) a carrying case.

12. A kit for making a quilted craft article, as defined in claim 6, wherein said substrate is expanded polystyrene.

* * * * *